Patented Feb. 26, 1935

1,992,480

UNITED STATES PATENT OFFICE 1,992,480

PROCESS FOR THE PRODUCTION OF HIGHER ALCOHOLS, PARTICULARLY BUTYL ALCOHOL, FROM ETHYL ALCOHOL

Otto Fuchs, Constance, Germany, and Wilhelm Querfurth, Kreuzlingen, Switzerland, assignors to Deutsche Gold- und Silber-Scheideanstalt vormals Roessler, Frankfort - on - the - Main, Germany, a German company No Drawing. Application July 15, 1931, Serial No. 551,040. In Great Britain July 26, 1930

25 Claims. (Cl. 260—156)

It is well known that when ethyl alcohol is passed over dehydrogenating or dehydrating catalysts at high temperatures there are obtained condensation products which differ according to the prevailing conditions, as for example esters such as ethyl acetate, ketones such as acetone, and higher alcohols such as butyl alcohol. Details are not available with regard to the formation of undesired by-products, especially the decomposition of the ethyl alcohol into gaseous substances such as carbon monoxide, hydrogen, methane, ethylene etc. We have, however, found by testing published operating directions that the production of undesired by-products is considerable, especially at the high temperatures that are frequently recommended, and moreover that single products cannot be obtained by following such directions.

We have now found that the reactions can be substantially improved in several respects, particularly in regard to the yield obtained or the avoidance of undesired secondary reactions as well as with regard to the singleness of the product. This advance is achieved essentially by means of two main features of novelty. One of these consists in passing the alcohol over the contact substance together with hydrogen. In this way the yield in condensation products is, strange to say, even increased, although it would be expected that the added hydrogen would diminish the formation of aldehyde and, consequently, the possibility of condensation. That the action of the hydrogen is really a chemical one, is shown by the fact that by reducing the amount of added hydrogen to an amount substantially below the molecular ratio its action is considerably diminished and, further, by the fact that the employment of nitrogen instead of hydrogen represents a comparatively quite ineffective measure. The employment of hydrogen has, finally, the advantage that the formation of acetaldehyde and higher aldehydes such as, for example, butyric aldehyde, is relatively slight or that they are formed in such small quantities in relation to the unchanged alcohol that the latter can be returned to the process in conjunction with the aldehydes without any disadvantageous effect on the reaction.

The composition of the reaction product obtained varies according to the quantity of hydrogen used. If, however, the amount of hydrogen used is limited the reaction product for the most part consists of n-butyl alcohol.

A suitable range of ratios of hydrogen to ethyl alcohol vapour is from a half mol. hydrogen per mol. ethyl alcohol to three mols, hydrogen per mol. ethyl alcohol.

The second novel feature consists in the employment of a contact substance consisting essentially of an oxide of an alkaline earth metal particularly magnesia activated by the presence of relatively small quantities of catalytically active metals or metallic compounds especially metallic oxides. Such metals or oxides not only increase the yields of higher alcohols but enable the reaction temperature to be lower than would otherwise be possible, as for example below 400° C., and preferably between 200° C. and 350° C. The employment of hydrogen renders it possible in preparing the composite contact substance always to employ as activator metallic oxides or hydroxides obtained in any desired manner. A large number of compounds are suitable for these admixtures—e. g. lead oxide, thorium oxide, silver oxide, uranium oxide, cadmium oxide, tin oxide, chromium oxide, manganese oxide, zinc oxide, iron oxide, nickel oxide, cobalt oxide and copper oxide. Mixed activators consisting of two or more of these compounds can also be employed with advantage. Particularly valuable are admixtures in which copper predominates—e. g., silver oxide+copper oxide, tungsten oxide+copper oxide, manganese oxide+copper oxide, chromium oxide+copper oxide, and iron oxide+copper oxide. Copper oxide by itself can also be used with great advantage as the activator and gives very good yields at temperatures ranging from 260 to 300° C. Mixed activators, such as those just mentioned, of chromium oxide+copper oxide or manganese oxide+copper oxide, reduce the reaction temperature range to from 220 to 240° C.

Particularly surprising is the fact that all the activators, singly or admixed, are effective in relatively small amounts relatively to the magnesia,—e. g. quite a low percentage of the total composition—and, besides, they undoubtedly act only as activators of the magnesia, because magnesia by itself distinctly shows, even at 250° C., the formation of butyl alcohol and higher alcohols without appreciable quantities of other compounds or undesired by-products, although only a few per cent. of the alcohol passed over is converted.

The limitation of such activators to small amounts relatively to the magnesia, say less than 10 per cent. is also important for carrying out the reaction, inasmuch as in large amounts they favour the yield of by-products besides the higher alcohols. For example, a catalyst containing magnesium oxide and nickel oxide in molecular proportions converts 9 per cent. of the ethyl alcohol that is passed over it into butyl alcohol and 17 per cent. into methane and carbon monoxide, whilst a catalyst containing 99 per cent. of magnesium oxide and 1 per cent. of nickel oxide converts 20 per cent. of the alcohol passed over it into butyl alcohol and 10 per cent. into gaseous products. Similarly a catalyst containing magnesium oxide and copper oxide in molecular proportions converts 4 per cent. of the alcohol passed over it into butyl alcohol, whilst with a catalyst containing magnesium oxide and copper oxide in the ratio of 99 to 1, 21 per cent. of the alcohol is converted into butyl alcohol, and well below 1 per cent. into gaseous by-products. Also whereas contact substances containing only small admixtures of metallic oxide activators give besides aldehydes in limited quantities, normal butyl alcohol and, in addition, hexyl alcohol, contact substances containing metallic oxide activators in molecular proportions, give quite a preponderant quantity of acetaldehyde in addition to much smaller quantities of butyl alcohol and very small quantities of hexyl alcohol. At the same time, the contact bodies so constituted tend to form esters, such as ethyl acetate.

We have further found that the functional life of the catalyst is favourably influenced by admixture of substances that have no intrinsic catalytic effect but have a stabilizing effect, such for example the oxides or hydroxides of the alkaline earth metals or of aluminium. For example, if a catalyst consisting of magnesium oxide and 15 per cent. of copper oxide gives, in the first six hours, a yield of about 20 per cent. of butyl alcohol in addition to a few per cent. of higher alcohols, calculated on the ethyl alcohol employed, then, on continuing the experiment the yield falls to 8½ per cent. of butyl alcohol and 3½ per cent. of higher boiling products, particularly hexyl alcohol. If, however, the catalyst is prepared by replacing 9 per cent. of the magnesium oxide at the start with aluminium oxide in the form of commercial aluminium hydroxide, the initial yield of a total of 23 per cent. of butyl alcohol and higher alcohols remains unchanged for many days. The composition of the products obtained, in presence of a stabilizing agent as compared with a catalyst without this agent, may be modified.

Example 1

A mixture of ethyl alcohol and hydrogen, in the molecular proportion of 1:1.5, is passed at 260° C. over a catalyst consisting of 89 parts of magnesium oxide, 9 parts of aluminium oxide and 2.15 parts of copper oxide. 44 mols. per cent. of unchanged alcohol are obtained, whilst 12 mols. per cent. are converted into aldehyde, 8 mols. per cent. into oil (hexyl alcohol etc.) and 15 mols. per cent. into butyl alcohol, these being the average figures for an experiment lasting 160 hours.

Example 2

If, instead of using a catalyst with a stabilizing admixture, there is used one with only two components—e. g. a catalyst consisting of 98 parts of magnesium oxide and 1.5 parts of copper oxide—the yield in the first six working hours amounts to approximately 20 per cent. of butyl alcohol and 3.3 per cent. of oils. However, it very quickly drops and, in a continuous experiment lasting 48 hours, only 8.6 per cent. of butyl alcohol and 5.6 per cent. of oils (hexyl alcohol etc.) were obtained on the average, whilst catalysts such as that of Example 1 did not abate their activity in a prolonged experiment.

Substances such as aluminium oxide have a favourable effect not only on the activity but also on the mechanical efficiency of the catalyst. The catalyst may, for example, be prepared as follows:—The magnesia is mixed with copper oxide, and aluminium hydroxide is added with as much water as will produce a well kneadable paste, and this paste is, after being kneaded, dried on plates. The fragments obtained on breaking up the dried mass, which are of the size of peas, for example, have a considerable mechanical strength which remains even after prolonged use.

The aluminium oxide can obviously be replaced by similarly acting admixtures such as, for example, stannic acid gel. Silica gel may also be employed, in which case it is moreover, not at all necessary to use a still doughy hydroxide. Very good results are obtained with an ordinary commercial granular silica gel which is added in a fairly finely ground condition in quantities of 8 to 10 per cent. on mixing the catalyst. Stabilizing substances of an entirely different kind are also capable of exerting a similar action— e. g. a finely powdered wood charcoal that is poor in ash can be added in quantities of 12 per cent. and produce similarly good results with regard to the functional life and mechanical strength of the catalyst.

Since the catalysts employed, like all catalysts used in such organic reactions, from time to time require purification by treatment with oxidizing gases and steam at temperatures of, for example, 300 to 500° C., the stabilizing constituent in the case of wood charcoal completely vanishes during purification. Notwithstanding this, the favorable effect mentioned, on the course of the reaction and the stability and mechanical strength of the catalyst, remains. Obviously, therefore, all the substances mentioned serve to stabilize for a long time the initial surface activity that is favorable to the reaction, in spite of the temporary employment of temperatures up to 500° C. in purifying the catalyst, for example.

Freshly mixed catalysts are, advantageously, before being used for the first time, likewise subjected to a short treatment with moist gases containing oxygen, because they are then capable of immediately exerting their full catalytic action.

A few further examples will now be given.

Example 3

A mixture of ethyl alcohol and hydrogen, like that of Example 1, is passed at 260° C. over a catalyst consisting of 89 parts of magnesium oxide, 9 parts of aluminium oxide, 1.5 parts of copper oxide and 0.7 parts of silver oxide. In this case 40 per cent. of unchanged alcohol is obtained, whilst 15 per cent. is converted into acetaldehyde, 16 per cent. into butyl alcohol and 8 per cent. into hexyl alcohol.

Example 4

If the silver oxide in the catalyst of Example 3 is replaced by chromium oxide, there are obtained at 220° C., with a recovery of 48 per cent. of unchanged alcohol, 16 per cent. as acetaldehyde, 11 per cent. as butyl alcohol and 11 per cent. as hexyl alcohol. The quantity of hexyl alcohol obtained is, therefore, just as great as the quantity of butyl alcohol.

As the examples show, acetalydehyde is always produced in limited quantities, as owing to the presence of hydrogen any aldehydes formed tend to be reduced again to alcohols. The higher aldehydes, such as butyric aldehyde and, in some cases, crotonaldehyde, which are also produced, are represented only in very small percentages. The total quantity of aldehydes is separated from the butyl alcohol and the other higher alcohols, advantageously by distillation or some other suitable method, and returned to the reaction. Since, thanks to the presence of hydrogen and the employment of only small quantities of metals or metallic oxides in the catalyst as activators, the formation of aldehyde is very limited, this aldehyde on being returned mixed with alcohol in the proportion of one part to from 6 to 10 parts of alcohol again goes into the reaction and is, in this manner, rendered usable over and over again, without great loss resulting from, for example, decomposition into carbon monoxide and methane by the catalyst. The carrying out of the reaction under the conditions stated by us, moreover, allows mixtures of ethyl alcohol and acetaldehyde even in molecular proportions to be used and satisfactory conversion of the ethyl alcohol into higher alcohols to be effected, but the yield is reduced if the proportion of acetaldehyde is greater than the molecular proportion mentioned above.

Under the conditions described, esters are not detectable at all, or are detectable only in quantities of a few tenths per cent. in the product of the reaction. Similarly, no acetone or ketone could be at all isolated by working on the product of the reaction. In certain cases, particularly in cases of reaction temperatures above 300° C., it was possible to detect the presence of ketones only with very sensitive reagents.

In contradistinction to other processes, the present process does not need high pressures. Pressure does not affect the course of the reaction to a great extent, as might be expected from the equation of the reaction. However, increased pressure provides the possibility of putting larger quantities per litre of contact space through the reaction. The velocity of flow of the gaseous mixture over the catalyst is from one to ten gram molecules per hour per litre contact volume and the most satisfactory velocity of flow will depend on the pressure used and the catalyst. With higher pressures increased speed of passage may be realized.

The products of the reaction contain, in accordance with the composition of the catalyst the percentage of hydrogen used and the temperature of the reaction, about 50 to 85 per cent. of butyl alcohol (wholly normal butyl alcohol). Among the higher alcohols obtained, hexyl alcohol, especially normal hexyl alcohol, predominates. In addition, another hexyl alcohol, having a boiling point 5° lower, may be found in the product of the reaction. Further normal octyl alcohol has been found. Still higher crystallizable alcohols are found in smaller quantities. The ethyl alcohol employed may be anhydrous or may contain small amounts of water, e. g. commercial rectified spirit of 90–95 per cent. strength may be used. Preferably the amount of water present should not exceed 10 per cent. by weight of the ethyl alcohol.

In the above specification and in the following claims the term "alkaline earth metals" is intended to include magnesium, calcium, strontium and barium.

What we claim is:—

1. A process of producing higher aliphatic alcohols comprising passing vaporous ethyl alcohol in conjunction with hydrogen over heated catalytic material comprising magnesia as the preponderant constituent and copper oxide as the second constituent.

2. A process of producing higher aliphatic alcohols comprising passing vaporous ethyl alcohol in conjunction with hydrogen over heated catalytic material comprising magnesia as the preponderant constituent and copper oxide and aluminium oxide as further constituents.

3. A process of producing higher aliphatic alcohols comprising passing vaporous ethyl alcohol in conjunction with hydrogen over heated catalytic material comprising magnesia as the preponderant constituent, copper oxide and aluminium oxide as further constituents at operating temperatures between 200 and 400° C., separating out the higher aliphatic alcohols and re-using the remaining mixture containing the unchanged ethyl alcohol and some aldehyde as initial materials in continued operation.

4. A process of producing higher aliphatic alcohols comprising passing vaporous ethyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide, a stabilizer taken from a group consisting of hydroxides of alkaline earth metals, aluminum oxide, aluminum hydroxide, stannic acid gel, silica gel and charcoal.

5. A process of producing higher aliphatic alcohols comprising passing vaporous ethyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide, a stabilizer taken from a group consisting of hydroxides of alkaline earth metals, aluminum oxide, aluminum hydroxide, stannic acid gel, silica gel and charcoal.

6. A process of producing higher aliphatic alcohols comprising passing vaporous ethyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and aluminum oxide as a stabilizer.

7. A process of producing higher aliphatic alcohols comprising passing vaporous ethyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and silica gel as a stabilizer.

8. A process of producing higher aliphatic alcohols comprising passing vaporous ethyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and charcoal as a stabilizer.

9. A process of producing higher aliphatic alcohols comprising passing vaporous ethyl alcohol in conjunction with hydrogen over a heated catalytic material comprising an alkaline earth metal oxide as the preponderant constituent copper oxide as an activator and a stabilizer taken from a group consisting of hydroxides of alkaline earth metals, aluminum oxide, aluminum hydroxide, stannic acid gel, silica gel and charcoal.

10. A process of producing higher aliphatic alcohols comprising passing vaporous ethyl alcohol in conjunction with hydrogen over a heated catalytic material comprising an alkaline earth metal oxide as the preponderant constituent, silver oxide as an activator and a stabilizer taken from a group consisting of hydroxides of alkaline earth metals, aluminum oxide, aluminum hydroxide, stannic acid gel, silica gel and charcoal.

11. A process of producing higher aliphatic alcohols comprising passing vaporous ethyl alcohol in conjunction with hydrogen over a heated catalytic material comprising an alkaline earth metal oxide as the preponderant constituent, zinc oxide as an activator and a stabilizer taken from a group consisting of hydroxides of alkaline earth metals, aluminum oxide, aluminum hydroxide, stannic acid gel, silica gel and charcoal.

12. A process of producing higher aliphatic alcohols comprising passing varopous ethyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and aluminum oxide as a stabilizer.

13. A process of producing higher aliphatic alcohols comprising passing vaporous ethyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and silica gel as a stabilizer.

14. A process of producing higher aliphatic alcohols comprising passing vaporous ethyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and charcoal as a stabilizer.

15. A process of producing higher aliphatic alcohols comprising passing vaporous ethyl alcohol in conjunction with hydrogen over a heated catalytic material comprising magnesia as the preponderant constituent, copper oxide as an activator and a stabilizer taken from a group consisting of hydroxides of alkaline earth metals, aluminum oxide, aluminum hydroxide, stannic acid gel, silica gel and charcoal.

16. A process of producing higher aliphatic alcohols comprising passing vaporous ethyl alcohol in conjunction with hydrogen over a heated catalytic material comprising magnesia as the preponderant constituent, silver oxide as an activator and a stabilizer taken from a group consisting of hydroxides of alkaline earth metals, aluminum oxide, aluminum hydroxide, stannic acid gel, silica gel and charcoal.

17. A process of producing higher aliphatic alcohols comprising passing vaporous ethyl alcohol in conjunction with hydrogen over a heated catalytic material comprising magnesia as the preponderant constituent, zinc oxide as an activator and a stabilizer taken from a group consisting of hydroxides of alkaline earth metals, aluminum oxide, aluminum hydroxide, stannic acid gel, silica gel and charcoal.

18. A process of producing higher aliphatic alcohols comprising passing vaporous ethyl alcohol in conjunction with hydrogen over a heated catalytic material comprising an alkaline earth metal oxide as the preponderant constituent, copper oxide as an activator and aluminum oxide as a stabilizer.

19. A process of producing higher aliphatic alcohols comprising passing vaporous ethyl alcohol in conjunction with hydrogen over a heated catalytic material comprising an alkaline earth metal oxide as the preponderant constituent, copper oxide as an activator and silica gel as a stabilizer.

20. A process of producing higher aliphatic alcohols comprising passing vaporous ethyl alcohol in conjunction with hydrogen over a heated catalytic material comprising an alkaline earth metal oxide as the preponderant constituent, copper oxide as an activator and charcoal as a stabilizer.

21. A process of producing higher aliphatic alcohols comprising passing vaporous ethyl alcohol in conjunction with hydrogen over a heated catalytic material comprising magnesia as the preponderant constituent and silver oxide as the activator.

22. A process of producing higher aliphatic alcohols comprising passing vaporous ethyl alcohol in conjunction with hydrogen over a heated catalytic material comprising magnesia as the preponderant constituent and zinc oxide as an activator.

23. A process of producing higher aliphatic alcohols comprising passing vaporous ethyl alcohol in conjunction with hydrogen over a heated catalytic material comprising magnesia as the preponderant constituent, and an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide.

24. A process of producing higher aliphatic alcohols comprising passing vaporous ethyl alcohol in conjunction with hydrogen over a heated catalytic material comprising magnesia as the preponderant constituent, copper oxide as an activator and silica gel as a stabilizer.

25. A process of producing higher aliphatic alcohols comprising passing vaporous ethyl alcohol in conjunction with hydrogen over a heated catalytic material comprising magnesia as the preponderant constituent, copper oxide as an activator and charcoal as a stabilizer.

OTTO FUCHS.
WILHELM QUERFURTH.